US006594257B1

United States Patent
Doshi et al.

(10) Patent No.: US 6,594,257 B1
(45) Date of Patent: *Jul. 15, 2003

(54) NETWORK-BASED METHOD AND APPARATUS FOR INITIATING AND COMPLETING A TELEPHONE CALL VIA THE INTERNET

(75) Inventors: Rajesh R. Doshi, Edison, NJ (US); Timothy Kearney, Cedar Grove, NJ (US); Gautham Natarajan, Marlboro Township, Monmouth County, NJ (US); Dominic M. Ricciardi, Bridgewater, NJ (US); Robert E. Witte, Long Valley, NJ (US)

(73) Assignee: AT&T Corp., New York, NY (US)

( * ) Notice: Subject to any disclaimer, the term of this patent is extended or adjusted under 35 U.S.C. 154(b) by 305 days.

This patent is subject to a terminal disclaimer.

(21) Appl. No.: 09/656,829

(22) Filed: Sep. 7, 2000

Related U.S. Application Data

(63) Continuation of application No. 08/908,206, filed on Aug. 7, 1997, now Pat. No. 6,144,667.

(51) Int. Cl.⁷ .............................................. H04L 12/66
(52) U.S. Cl. ..................... 370/352; 370/401; 379/88.17
(58) Field of Search ................................ 370/352–356, 370/400, 401; 709/200–206; 379/88.17

(56) References Cited

U.S. PATENT DOCUMENTS

| 5,247,571 A | 9/1993 | Kay et al. ............... 379/222.09 |
| 5,436,957 A | 7/1995 | McConnell ............... 379/58.23 |
| 5,602,846 A | 2/1997 | Holmquist et al. .......... 370/384 |
| 5,661,790 A | 8/1997 | Hsu ....................... 379/209.01 |
| 5,764,955 A | 6/1998 | Doolan ....................... 709/223 |
| 5,790,548 A | 8/1998 | Sistanizadeh et al. ........ 370/401 |
| 5,818,836 A | 10/1998 | DuVal ........................ 370/389 |
| 5,838,682 A | 11/1998 | Dekelbaum et al. ........ 370/401 |
| 5,884,032 A | 3/1999 | Bateman et al. ............. 709/204 |
| 5,940,598 A | 8/1999 | Strauss et al. .............. 709/249 |
| 6,144,667 A | * 11/2000 | Doshi et al. ................. 370/401 |

OTHER PUBLICATIONS

WO 97/22210 Low, Bouthors, "Call setup gateway for telecommunication system", WIPO/IB, Jun. 1997.

* cited by examiner

*Primary Examiner*—Hassan Kizou
*Assistant Examiner*—John Pezzlo

(57) ABSTRACT

A network-based method for initiating and completing a voice telephony call via the Internet comprises the steps of receiving call completion data at a voice/data network gateway of the public switched telephone network from an Internet application web server, which may comprise an Internet service provider or other entity serving Internet users via an Internet application web server, and transmitting call completion data to telecommunications switches for connecting an Internet user to a telephone of an application agent associated with the Internet server. The application agent may be associated with a 1-8YY toll-free number or other national or international telephone number. Call progress data is translated into data communications protocol format to be returned to the Internet server where it may be displayed to the user. Preferably, the link between the Internet application web server and the voice/data network gateway comprises a telecommunications data link, for example, an ISDN data link. Once a voice telephone call is established between a user and an application agent, other parties may be added to the call via a conference bridge. Other services and features that may not be available or implementable in a customer premises based system but are in a network-based solution comprise tone, video, facsimile, video, modem, speech recognition and other features.

12 Claims, 4 Drawing Sheets

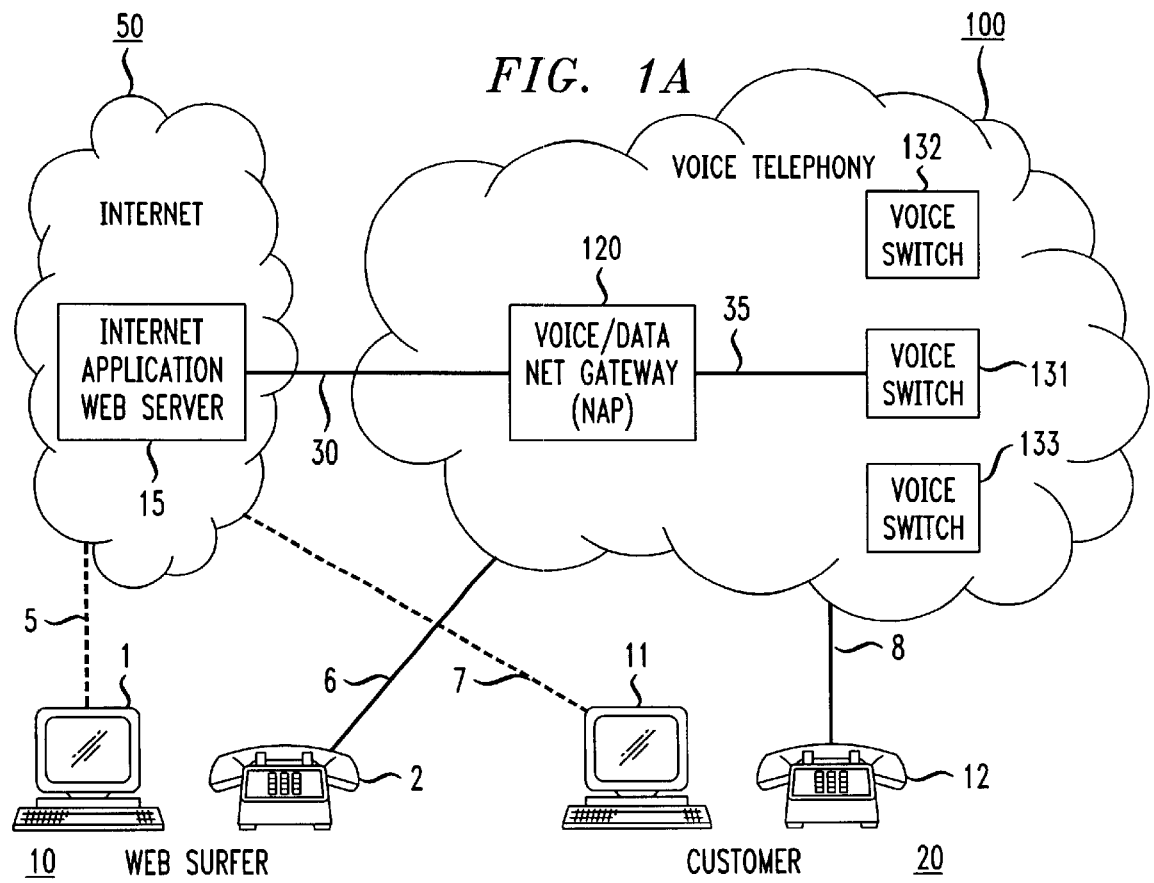
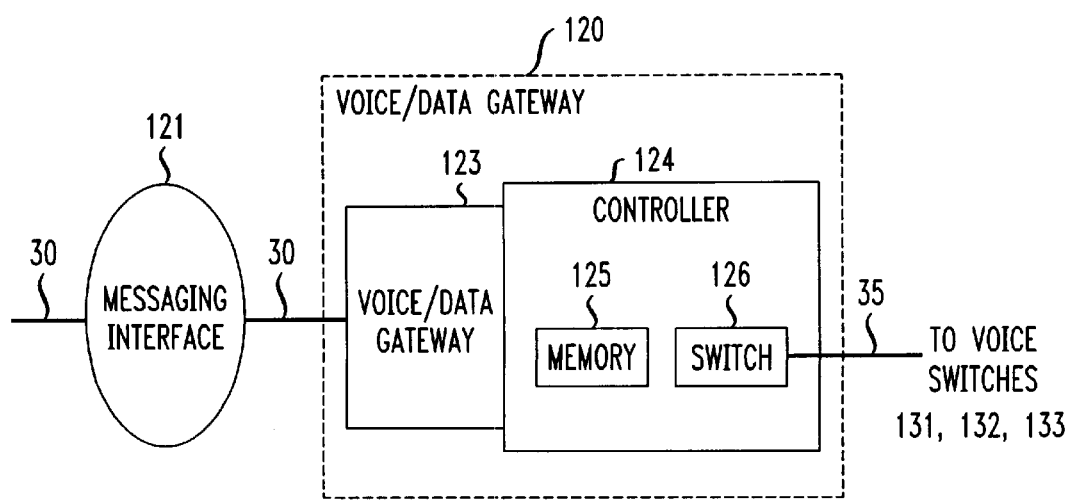

FIG. 3

| API FUNCTION CALL | MESSAGE SENT TO GTS | MESSAGE RECEIVED FROM GTS |
|---|---|---|
| ASSOCIATE HOLD MUTE () | E_ASSOC_WEIGHTS | R_ASSOC_WEIGHTS |
| BRIDGE ANNC () | E_BRIDGE_ANNC | R_BRIDGE_ANNC |
| BRIDGE CLEANUP () | E_BRIDGE_CLEANUP | R_BRIDGE_CLEANUP |
| BRIDGE INIT () | NONE | NONE |
| BRIDGE SESSION () | E_SESSION_BRIDGE | R_SESSION_BRIDGE |
| COLLECT DIGITS () | E_COLLECT_DIGITS | R_COLLECT_DIGITS |
| CONNECT CALL () | E_CALL_CONNECT | R_CALL_CONNECT |
| CREATE CALL () | E_CALL_CREATE | R_CALL_CREATE |
| CREATE SESSION () | E_SESSION_CREATE | R_SESSION_CREATE |
| DESTROY CALL () | E_CALL_DESTROY | R_CALL_DESTROY |
| DESTROY SESSION () | E_SESSION_DESTROY | R_SESSION_DESTROY |
| DISCONNECT CALL () | E_CALL_DISCONNECT | R_CALL_DISCONNECT |
| EVE_CALL DISCONNECTED () | NONE | NONE |
| EVE_DIGITS COLLECTED () | NONE | NONE |
| HANDLE_CB () | NONE | NONE |
| MONITOR DIGITS () | E_MONITOR_DIGITS | R_MONITOR_DIGITS |
| PLAY ANNC () | E_PLAY_MESSAGE | R_PLAY_MESSAGE |
| PLAY ANNC AND COLLECT () | E_PLAY_ANNC_AND_COLLECT | R_PLAY_ANNC_AND_COLLECT |
| PLAY TTS () | E_PLAY_TTS_ | R_PLAY_TTS_ |
| PLAY TTS AND COLLECT () | E_PLAY_TTS_AND_COLLECT | R_PLAY_TTS_AND_COLLECT |
| REQ_ADD INPUT () | NONE | NONE |
| REQ_DROP INPUT () | NONE | NONE |
| UNBRIDGE ANNC () | E_UNBRIDGE_ANNC | R_UNBRIDGE_ANNC |

NETWORK-BASED METHOD AND APPARATUS FOR INITIATING AND COMPLETING A TELEPHONE CALL VIA THE INTERNET

CROSS REFERENCE TO RELATED APPLICATIONS:

This application is a continuation of U.S. patent application Ser. No. 08/908,206, filed Aug. 7, 1997, now U.S. Pat. No. 6,144,667 issued Nov. 7, 2000 entitled Network-Based Method and Apparatus For Initiating And Completing a Telephone Call Via The Internet.

BACKGROUND OF THE INVENTION

1. Technical Field

The present invention relates to the fields of Internet and telephonic communication and, more particularly, to a public telecommunications network-based method and apparatus for initiating and completing a telephone call, especially a voice telephony call, via the Internet. In this manner, a user may communicate with an agent by voice about information, products and services offered via the Internet without the voice telephony call's having to originate from customer premises equipment.

2. Description of the Relevant Art

The popularity of the international World Wide Web is increasing at an extraordinary rate. The World Wide Web, also referred to as the Internet, provides an alternative means of communication between users. The users may be private individuals or entities offering information, products and services. Presently, a user is typically equipped with a personal computer or intelligent telephone and a data modem and the user may be coupled directly to the Internet via a public telecommunications network, local area network (LAN) or otherwise. By, for example, dialing a predetermined telephone number access, a user presently connects to the Internet via a server which communicates with other servers by transmitting and receiving variable length packets of data in an established Internet Protocol (IP) format. The data modem typically has a bandwidth limited to voiceband frequencies at present but, with the advent of so-called cable modems for providing services via hybrid coaxial cable/optical fiber facilities, the access bandwidth will be considerably increased to many times voice bandwidth. Wider bandwidth facilities also may emerge for delivery of services via satellite or other radio frequency path. Between servers, the bandwidth is shared and may be at very wide bandwidth or narrow bandwidth, depending on the shared availability of facilities. Between servers, large data files of, for example, high resolution images may be passed at high rates of speed, while the user who is a private individual and is limited to voice telephony bandwidth presently must await a slower transmission from the server to the home. Moreover, if the user wishes to converse with a live individual, the user may not be able to do so. Consequently, the provision of products, services and information over the Internet can be slow and inefficient.

Users who desire access to on-line accessible catalogs, travel, data files and the like presently link via the Internet to host servers which provide so-called Web pages providing instructions on how to utilize various offered information, products and services. Once connected to such services, for example, it is possible to determine that a bargain air fare is available from one city to another at a certain time on a certain date. But rather than having to reenter alternative times and dates and the like looking for a response from the Internet connected air carrier, it may become useful and desirable for a user, often referred to as a web surfer, to speak to an agent of the air carrier. Presently, to do so, one may print out reference data on a web page from accessing the Internet site and make a separate telephone call to the air carrier. This activity is both inefficient and time-consuming.

It is desirable to initiate and complete a voice telephone call via the Internet, while data received via the Internet is displayed on a user's screen regarding the desired information, product or service, thus saving the user time and the inefficiency of having to disconnect from the Internet and reconnect via the public switched telecommunications network. The Internet product, service or information service provider may also gain from such availability by being able to efficiently and quickly serve a web surfer's needs. Thus, the service provider may generate increased revenue from the connection.

One solution to the problem of providing Internet or intranet and telecommunications voice telephony linkage between a customer and a merchant facility involves the use of a "call me" icon according to U.S. patent application Ser. No. 08/736,150, filed Oct. 24, 1996, of Foladare et al., entitled "System and Method for Establishing Internet Communications Links" (the '150 application). When a web surfer is surfing the World Wide Web, the web surfer may come across a Web Page with a "call me" icon suggesting that a live service representative of a merchant call the web surfer. Typically, the merchant's facility comprises a server linked to a private branch exchange (PBX) such that the server may signal the PBX to call the customer as soon as a service representative is free and thus establish a voice telephony link between a next available service representative and a customer. Such a signaling link between a server and a PBX and accompanying software changes, as necessary, must be established at each merchant customer premises facility. The PBX may not be able to accommodate the changes and so require reengineering. Such a customer premises based solution to the initiation of a voice telephony call may not afford advantages that another alternative solution, such as a public telecommunications network-based solution, may provide.

SUMMARY OF THE INVENTION

According to the principles of the present invention, the difficulties in placing a telecommunications call via the Internet from customer premises equipment is overcome by providing a voice/data network gateway, for example, via a known network adjunct platform (NAP) of the public switched telecommunications network (PSTN), the voice/data network gateway for permitting the initiation and completion of telecommunications calls. The voice/data network gateway is coupled with the Internet "web application" web server (for example, that of an air carrier) via a telecommunications data link for transmitting a message for triggering the NAP to establish the call. In this manner, functionality is shared among host servers and customers alike, and no modifications to customer premises equipment are required. A network-based solution may be implemented independent of the choices made by a customer for customer premises equipment. Furthermore, a network-based solution provides for higher call volume, greater security, permits service enhancements, integration with other network features and extensibility to new and different combinations of service offerings and packages. Also, a network-based solution offers higher reliability and centralized operations, administration, maintenance and provisioning.

Web application as used herein refers to a desired destination for any application of the present invention for electronic commerce or other application on the web including but not limited to the offering of information, products, services and data files over the Internet from the desired destination. By clicking on a call request icon, appropriate information is forwarded via, for example, a telecommunications data link to the messaging interface to complete the call including caller telephone number, application telephone number and any call charge information.

The user or the application may presubscribe to the present service with a local or toll telecommunications service provider by providing required billing or call charge data to the service provider. The voice/data network gateway, having been thus triggered, immediately sets up a telecommunication link between the calling party and a called party, such as the application agent's telephone number, via known in band and out-of-band signaling links, for example, via ISDN interfaces through the public switched telephone network to serving central offices. In this manner, an application agent associated with the Internet application web server may address any concerns or requests for changes and the like voiced by the user. The user need not dial the agent and the agent need not dial the user.

The network adjunct platform communicates with an Internet web server via a data communications protocol, for example, an implementation of the known TCP/IP protocol suite or, in one embodiment, UDP, a transport protocol. Periodically during the set-up of a call, the gateway communicates with the web server (client). The voice/data network gateway becomes a server with multiple potential clients (although there may be many such servers such as the present gateway established in a public switched telephone network). The process may comprise the application client web server's initiating request messages of the voice/data network gateway and the latter providing response messages. For example, the voice/data network gateway may translate and provide received call status information via the data communications protocol interface to the Internet application web server as it receives such information from the voice telephony network. As will be explained herein, the process may involve the steps of receiving a message from the web server at the voice/data network gateway generated by a so-called "function call", the function call identifying a particular function and requesting a response. Then the following step involves transmitting a status response to the web server indicative of status relative to the requested function. Also, the step of receiving call information may further involve the step of receiving a callback from the web server indicating further data relative to the function and the status response. In this manner, any number of functions may be performed including, but not limited to, initialization and termination functions, session management functions, call management functions, announcement functions, conferencing functions, dual tone multi-frequency (DTMF) signaling monitor and collect functions, event notification functions and socket event functions as will be further described herein. Briefly, these functions include creating or tearing down calls or sessions, establishing or tearing down conference bridges, making announcements/prompts and receiving addressing instructions (for example, collecting telephone numbers or other digital data).

In accordance with the present invention, the web application may have a toll-free number (for example, 1-8YY number) or another national or international number. Moreover, once a call between a web surfer (user) and an application is established, other parties may be bridged on to the call through a conference bridge upon request of either party.

Further features and advantages of the present invention will be understood from studying the drawings and the following detailed description of the invention.

BRIEF DESCRIPTION OF THE DRAWINGS

FIG. 1 is a block schematic drawing comprising an overview of the present invention; FIG. 1a comprises a system block diagram useful for describing the call process for initiating and completing a telephone call from an Internet web page; FIG. 1b provides an overview of the network adjunct platform 120 comprising a messaging interface 121 and a voice/data network gateway 123 of the present invention.

FIG. 3 is a chart providing a list of function calls between the NAP 120 and a core server, shown in FIG. 1c identified as an AT&T Call Broker useful for describing the data communications protocol interface 30 (for example, UDP) shown first in FIG. 1a.

DETAILED DESCRIPTION

Figure 1C:
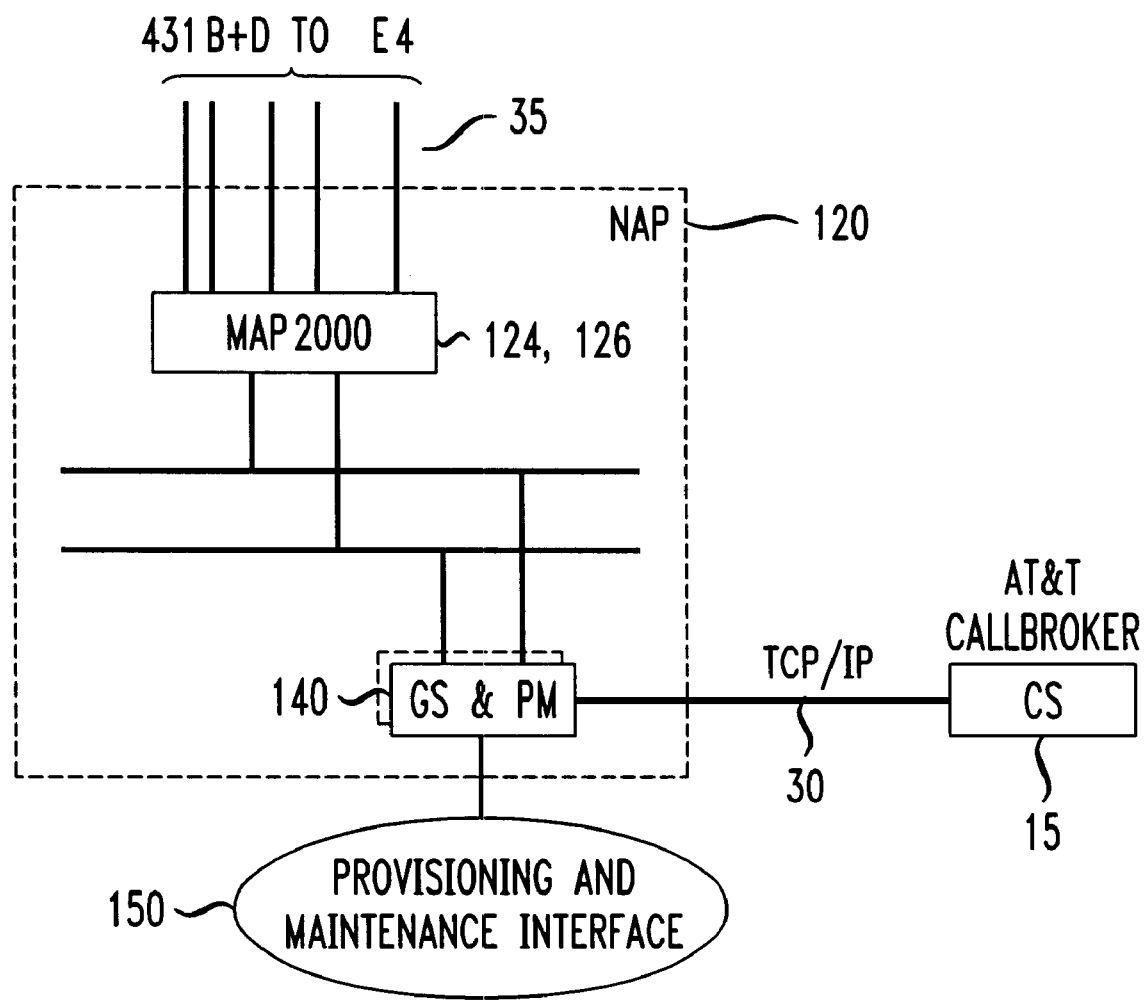
FIG. 1c provides a schematic block diagram of one embodiment of the network adjunct platform (NAP) 120 of FIG. 1b for communicating with toll switches and with a core server 15.

Referring to FIG. 1a, there is shown a system block diagram showing the components of a system, including a voice data network gateway 120, which as will be further described herein in conjunction with an explanation of FIG. 1c may be associated with a network adjunct platform, for initiating and completing a voice telephony call via the Internet 50. A voice/data network gateway 120, for example, may comprise a network adjunct platform, comprising a collection of multi-purpose servers, e.g. MAP 100, 200 or 1000, 2000 manufactured by Lucent Technologies Inc. interconnected by a wide (or local) area network to process calls. In one embodiment shown in particular detail in FIG. 1c, the network adjunct platform 120 comprises a MAP 2000 processor manufactured by Lucent Technologies Inc., a gateway server (GS) such as a MAP 100C server and a provisioning and maintenance (PM) unit. These interface with a core server CS (shown in FIG. 1c as an AT&T Call Broker) for controlling the generation, completion and monitoring of calls that is responsive to and outputs telecommunications protocol format messages, for example, from the TCP/IP suite of protocols, in one embodiment, the UDP data transport protocol as will be further described herein.

Referring again to FIG. 1a, a typical user may be a private individual or business at a location 10. The user is referenced in the drawing as a Web Surfer, which is becoming common parlance for one who frequently uses the so-called World Wide Web or the Internet to connect to various web sites around the world. At web sites are located servers for providing access to pages of data, typically via the clicking or double clicking of a mouse. These in accordance with the present invention are referred to as applications or desired destinations where live service representative agents may man telephones for voice telephony links with users. Such user clicking activity or alternate selection activity signals the display of a new page or can actuate the automatic connection of a user to a new server. Web surfer location 10 comprises a personal computer 1 having a modem for connecting via access link 5, which may be telephony, radio frequency, hybrid fiber/cable, local area network (LAN) or other facility, to Internet 50. A telephony modem typically provides service to users at voice telephony bandwidth at data speeds typically under 100 kilobits per second.

A user at location 10 presubscribes to service by contacting an Internet service provider such as AT&T, and a local or toll-free telecommunications link 5 to the Internet may be utilized for accessing service. In a cable modem environment, improved access facilities provide data rates in excess of one megabit per second. Other means for connecting to the Internet may comprise a local area network (LAN) or other facility. Once linked to a service provider, the user 10 may input addresses or, via various search engines, obtain and click on Internet addresses for any application server anywhere in the world. For example, one well known provider of travel information via Microsoft is the Expedia web site where a user may obtain information on the lowest cost air fares presently available on a certain date between point A and point B. The user may then select and purchase the low air fare directly by accessing and communicating with the application web site of the air carrier.

Presently, once a user has accessed an application web site 15 via the Internet, there is no public switched network-based way to initiate a voice telephony call between the user and an application agent, for example, an air travel agent of an air carrier represented by location 20. Either the user must manually place the call via telephone 2 to an application agent at customer location 20, for example, the air carrier or the application must provide for placing the call via customer premises equipment. In the latter case, the voice telephony call is triggered via, for example, double clicking with a mouse on a similar call request icon of an Internet page as that described by Foladare et al., the '150 application. Customer location 20 may typically comprise a personal computer 11 and a telephone 12 to which calls are distributed to a called party, for example, an application agent via an automatic call distributor (not shown) on a first come first served basis. An automatic call distributor may be associated with a private branch exchange and station equipment, all of which equipment at location 20 comprising customer premises equipment. Typically, an application agent is equipped with an operator headset and a computer 11 with a display that can provide, for example, air travel information very quickly and permit the agent to reserve and bill for a particular flight. Computer 11, however, according to prior art processes, may not have Internet access capability. The application agent, moreover, typically will not have any information about the call or caller except caller identity (such as calling telephone number and associated user data look-up) provided by caller identification services. For example, the application agent may not have any idea about what air travel the user is interested in. In respect to the Internet communication, the user may forego a voice telephony call and input other alternative dates and times and even arrange to purchase tickets via the Internet, but the user may find it greatly beneficial and a savings of time to immediately speak with an agent, rather than utilize the Internet, which can be slow and tedious.

As is known in the art, the user may use their telephone 2 to dial a toll free (such as a 1-8YY number) or other national or international number for the application agent and speak with them by initiating the call themselves. Typically, this involves a long wait in an incoming call queue and involved interaction with a prerecorded announcement prompting machine. To some extent, this wait can be alleviated by using the call process described by U.S. Pat. No. 3,961,142 and related patents which teach the principle of utilizing a voice detector for detecting when the agent has finally picked up a user's call whose line has been placed on hold and alerting the user to the agent's presence. According to that patent, one may place a call to a busy agent and be alerted when the application agent is finally available to speak with the user. It would still be desirable if a web surfer at location 10 were able to initiate the voice telephony call via the Internet 50 via a network-based solution. Application agents at location 20 could have access to the same Internet information that the web surfer at location 10 has accessed and could communicate with each other to reserve and arrange payment for desired flights. Since the agent could know what the user is interested in, the agent's time is saved and, since the user can talk to a live agent without having to access or return to Internet pages to obtain information, the user's time is saved. Moreover, a network-based solution provides a shared resource solution that can handle larger traffic capacities and does not require modification of application customer premises equipment.

According to the present invention, a user or customer or both presubscribe to the present service and accesses a site on the Internet. Internet application web server 15, which may comprise any programmed web server according to the present invention, responsive to the user's double clicking on a call request icon, such as a "call me" icon, communicates via a telecommunications data link 30 with a voice/data network gateway 120 of the public or toll switched telecommunications network 100. Such a voice/data network gateway 120 is available from Lucent Technologies Inc. and may comprise a plurality of multi-purpose servers for the purposes of automatically placing a telephone call (however, not an Internet initiated call until the present invention). As will be further described herein with reference to FIG. 3, all necessary information is forwarded via data links 30 and 35 for completing the call, including but not limited to caller telephone number, application agent telephone number and call charge information, to voice/data network gateway 120 and on to the voice telephone network 100. Voice/data network gateway 120 then, thus triggered, responds to the message by initiating and controlling the completion of a voice telephone call. Telecommunications data link 30 may, for example, comprise a wideband data link or other convenient data link, such as a 56 kilobit per second wideband data link between server 15 and gateway 120 operative within a data communications protocol, for example, from the TCP/IP suite of protocols or, in one embodiment, the UDP data transport protocol as will be described herein. Gateway 120 may be referred to as an adjunct processor for automatically initiating and completing calls in the voice telephony network, modified for Internet communication as will be described also herein. The gateway 120 communicates via known in band or out-of-band signaling links, for example, via an ISDN interface 35 with voice switches 131, 132 or 133, which may be a local, tandem or toll switch, to initiate a call from web surfer 10 via link 6 to the voice telephony network and via link 8 to the Internet application agent location 20, referred to in the drawing as customer location 20. Also, not shown, NAP 120 may initiate, responsive to input from an application agent or web surfer, calls to other parties to be bridged via a conference bridge to the connection as necessary.

Referring briefly to FIG. 1b, there is shown an overview of a network adjunct platform 120 modified according to the present invention. Wideband data link 30 operating with the TCP/IP protocol is connected between the voice/data network gateway 120 and the web server. Also, voice circuits and data links, for example, in band or out-of-band signaling links 35, preferably ISDN interface links, to voice switches 131, 132, 133 may originate at switch 126 of gateway 120. Messaging interface 121 is coupled to gateway 120, for example, a network adjunct platform modified according to the present invention, via link 30 to a voice/data gateway 123. Via the voice/data gateway 123, controller 124, for example, receives the data from server 15 and, referring to memory 125, checks and recovers information it needs for initiating the completion of a voice telephone call. Also associated with voice/data network gateway 120 is a prompting/announcement circuit for generating announcement/prompts at appropriate points in time during the processing of a voice telephony call such as: "Please enter your call request access code;" or "Please enter your agent identification number;" or "Thank you." A functional block schematic diagram of one embodiment of a voice data network gateway 120 is shown in FIG. 1c. Other embodiments of a voice/data network gateway 120 may come to mind of one of ordinary skill in the art. In this particular embodiment, links 35 may comprise 431 voice channels and a data channel (such as ISDN size) to a voice switch (local, tandem or toll switch), for example, a toll switch such as a #4ESS switch manufactured by Lucent Technologies Inc. In this depicted embodiment, a MAP 2000 processor/switch 124, 126 manufactured by Lucent Technologies, Inc. is the main controller for initiating and controlling the completion of voice telephone calls. A gateway server (GS), a voice/data gateway and provisioning/maintenance unit 140 operate as follows. The gateway server communicates via a transport protocol of the TCP/IP suite of telecommunications protocols, such as the UDP data transport protocol, with a web server 15, such as an AT&T call broker available from Silicon Graphics, Inc. as their Challenge web server 15. Link 30 is a telecommunications data link sized for the traffic and, for example, operates at 56 kilobits. Messaging thereon will be further described in detail herein. The provisioning/maintenance unit communicates as necessary with maintenance and provisioning systems via interface 150 which systems may be distributed or centralized as is known in the art and couple via a wide are network or local area network as necessary.

Figure 2:
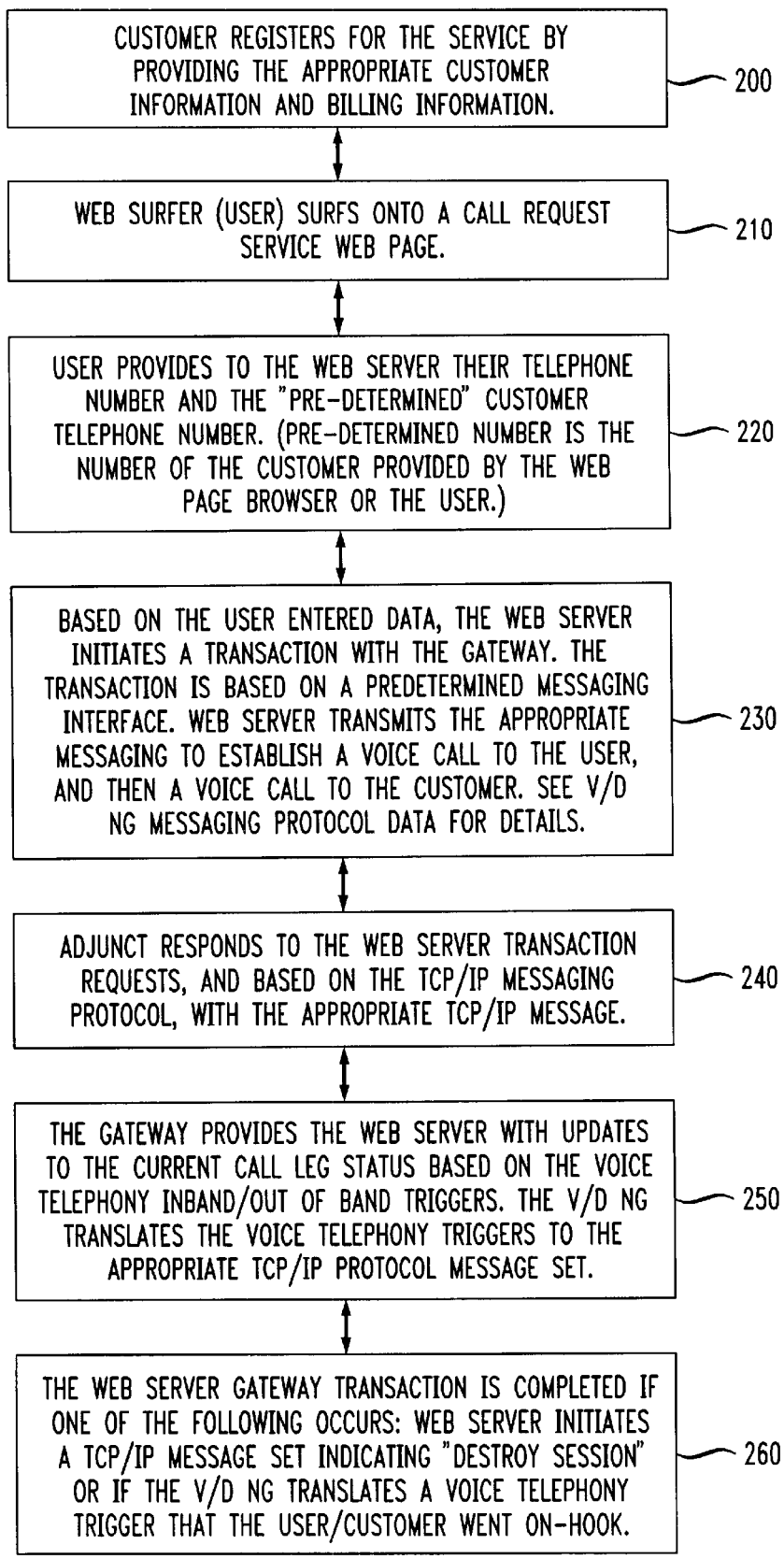
FIG. 2 is a detailed call processing flow diagram for describing the initiation and completion of a voice telephony call via the system of FIG. 1.

Referring now to FIG. 2, further details of the call processing algorithm of the present invention will be described with reference to FIG. 1 via the depicted call flow diagram for establishing voice telephony calls via the Internet. Referring first to step 200, a user web surfer 10 or, more typically, a customer 20 registers for the present call request service by providing appropriate user/customer information and billing information to a call request service provider 15 such as AT&T, a local exchange carrier or another toll service provider. The call request service provider may be different or the same entity as the Internet application web service provider with whom the customer 20 must also register and provide call request data such as telephone number for association with a call request icon. To perform its functions, the call request icon is associated with a web surfer telephone number and a destination application telephone number so that a voice telephony call may proceed.

At step 210, a web surfer user at location 10 surfs the World Wide Web via access link 5, which may be a voice telephony, cable modem link, local area network or other facility to Internet network 50 until they locate a desired call request service web page associated with the customer location 20 where may be located an application agent. A typical customer 20 or application may be an Internet service provider, a product or service catalog vendor, a travel service vendor, a public library, a government or educational entity, a search engine provider or the like. For example, the user may locate the availability of an inexpensive air fare from point A to point B at a location of an air carrier or a more generic travel service site such as Microsoft's Expedia, which collects and makes comparative data available for many air carriers. The customer 20 may provide on the web page via associated server 15 one or more call request icons for the air carrier or other call request customer location 20 and reach a live agent. Each call request icon may refer to a 1-8YY toll-free or other national or international telephone number for an application agent. Another example of a customer 20/application server 15 association may be an AT&T WorldShare (™) call request service welcome page where a user enters the telephone number, obtains a password and thereafter accesses associated services by entering their password.

At step 220, a user web surfer at location 10 enters into a page or via automatic preregistration has already entered their local telephone number. Also, the customer 20 may have already entered their telephone number associated with the call request icon, and/or the web page may request the user 10 to input a customer (application) telephone number. By pre-determined telephone number for the customer 20 in the drawing FIG. 2 is intended either the number of the customer 20 provided automatically via the web page browser software or manually by the telephone number provided by the user. The user 10 then, for example, clicks on the call request icon or otherwise signals and selects the initiation of the present automatic voice telephony dial service.

At step 230 and based on the user entered data, the Internet application web server 15 5 initiates a function call (as will be further described herein) or initiates a transaction with gateway 120 via telecommunications data link 30, preferably a data link appropriately sized for the traffic, for example, operating at approximately 56 kilobits per second. The transaction message is based on a telecommunications protocol, such as a predetermined messaging interface and protocol that will be further described in connection with FIG. 3. Briefly, transactions for initiating a voice telephony call comprise at least the calling party telephone number for telephone 2, the customer's identity or the telephone number of telephone 12 and call charge information, if necessary, for charging the user 10 or the customer 20, depending on the service provided. The web server 15 transmits the appropriate messaging data to the gateway 120 which controls the establishment of a voice call to the user telephone 2 via a link 6 and then (or in reverse order) a voice call to the customer telephone 12 via local link 8. According to known processes, and in the event an application agent is not immediately available, the caller link 6 may be a call alerting link that is established only after the link 8 to customer telephone 12 is established and a live agent answers. In one embodiment of the present invention, links 6 and 8 may comprise remotely adaptable amplification/attenuation circuits that permits gateway 120 to control the gain/loss on legs of a voice telephony call to assure that overall transmission loss is within network criteria.

In one embodiment or service, the voice/data network gateway 120 verifies that the user has preregistered for the service, for example, via a prompt, "Please enter your access code" and comparing the entered access code or otherwise checking to determine if the user is entitled to receive the call request service. In another or the same embodiment, the voice/data network gateway 120 verifies that the telephone number of the application is a valid telephone number (1-8YY number, national or international number) by referring to an appropriate database. Also, the agent's identity may be verified by prompting for agent identification data. The user or agent verification may be useful for billing verification for the service provided.

In order to establish the call, the voice/data network gateway 120 utilizes well known in band or out-of-band telecommunications signaling techniques, for example, ISDN interface links 35 to establish a voice telephony link among voice switches 131, 132 or 133 as necessary which may be local end offices, tandem offices, toll offices, international gateways or international offices. As is already known, voice/data network gateway 120 is preferably a shared network resource within public switched telephone network 100. There may be several such resources distributed throughout the public network 100.

At step 240, voice/data network gateway 120 communicates over the link 30 with the web server 15 of Internet 50, for example, in response to request messages as will be further described herein to indicate call processing status, data and requests, for example, that it has received and is processing the call. Preferably, the messages may be in data communications protocol format, for example, from TCP/IP messaging suite of protocols, and, in particular, in UDP data transport protocol format which will be discussed further with reference to FIG. 3. For example, TCP/IP is easily translated by the web server 15 but messaging may be in another format, if desired. The messages may comprise requests for call processing and status data, for example, status data of the network such as a network failure or invalid number, status of busy for one or the other party, status of ringing one or the other party, waiting live application agent or the like. In response to the received data, the web server 15 initiates further commands or requests. As a call progresses, gateway 120 translates received in band or out-of-band call status data via links 35 to an appropriate protocol such as a protocol within TCP/IP for forwarding to server 15 via link 30.

At step 250, the voice/data network gateway 120 provides the Web Server 15 further call processing status, for example, updates to the current call leg status based on voice telephony in band or out of band signaling transmitted triggers. Referring briefly to FIG. 1b, the voice data gateway 123 translates the voice telephony triggers received via the public switched telephone network 100 from voice switches 131, 132, 133 over signaling links 35 to, for example, TCP/IP format, as appropriate, for transmission via link 30 to server 15.

At step 260, the completion of a transaction via link 30 occurs in one embodiment of the present invention (and as will be further discussed with reference to FIG. 3) if one of the following occurs: the web server 15 initiates a TCP/IP message set indicating the destruction of the voice telephony session (the user cancels the call, predetermined time out or other intended or unintentional failure) or if the voice/data gateway 123 translates a voice telephony trigger indicating that either the user or customer went on hook once a call was established. If all call legs are disconnected, then the transaction is completed.

According to the present invention, a customer 20 and a web surfer 10 may share the same link to the same server 15 and consequently view the same Internet data via links 5 and 7 while speaking together via voice telephony links 6 and 8. Customer 11 may be an application agent with a split screen or windows capability for their terminal so that they may concurrently display alternative flight information, reserve and bill flights and view a web page simultaneously.

Also, once the user and an application agent are connected, one or the other party may bridge in to a conference call a plurality of, for example, up to eight parties by calling and linking a known conferencing bridge into the call and adding the new parties to that bridge.

In the particular implementation of a voice/data network gateway 120 shown in FIG. 1c, there is shown and described in connection with the attendant discussion of FIG. 1c an ISDN data link portion of voice/data links 35, for example, for signaling a toll center 132. A core web server (CS) 15 is physically connected to and communicates with a NAP 120 over a Wide Area Network (WAN). The CS 15 acts as the client in a client/server architecture, making requests to and receiving responses from the NAP 120, which acts as the server. Request messages, herein referred to as E messages, and response messages, referred to herein as R messages, are passed between the CS 15 and the NAP 120 to control and manage calls on the NAP 120. Messages may be passed between any of the subsystems of the NAP 120, including, in this embodiment a MAP 2000 124, 126 and a GS 140, to control call processing, perform administrative tasks and functions or manage maintenance activities. Call processing messages are associated with either a request to or a response from MAP 2000 124, 126. It is the MAP 2000 which provides features and capabilities to a voice telephony call.

Each E message is generated by a specific API function call on the client side (CS 15), requesting an action to be performed on the server side (NAP 120). E and R messages of function calls will be described further in a discussion of FIG. 3. Included in each request message are parameters that may be mapped from input parameters in the API function call required by the MAP 2000 to fulfill the request. For example, referring to the API function call ConnectCall( ) of FIG. 3, the E message, E_CALL_CONNECT, may be generated from the ConnectCall( ) API function and may include the following parameters: the caller's phone number, the called party's (application) phone number and the call handle which identifies the call, among other parameters that may be needed.

Each E message that is sent from the API interface of the CS 15 is received by a GTS process on the GS 140. This message may be passed from a GTS process to a GTRS process, which process also resides on the MAP2000. A GTS process may be responsible for communications with the API residing on CS 15. A GTRS process may be responsible for communications with a DIP process on the MAP2000. The GTRS and DIP processes may be physically connected by an Ethernet LAN or other data network.

A DIP process of the MAP 2000 executes the request on the MAP 2000, resulting in one of a number of outcomes such as success, failure or error. Once its execution is completed, the DIP process generates an R message response and sends it to the GTRS process. The R message includes a status value indicating the outcome of the request. For example, if a ConnectCall( ) request results in a call to a busy telephone number over one of links 6 or 8, the status returned would be ERR_LINE_BUSY. This response message or R message is passed through the GTRS and GTS processes and terminates finally at the API interface of the CS 15. The API identifies the message and calls a corresponding callback function. For example, the response message for a ConnectCall( ) request is an R message R_CALL_CONNECT, which may generate a CB_ConnectCall( ) callback function call using the status returned as one of the function input parameters.

The function calls of FIG. 3 may be categorized into groups as follows: initialization and termination, session management, call management, announcement, conferencing, DTMF monitoring and collection, event notification and socket event notification. For example, initialization and termination functions may include BridgeCleanup( ) and BridgeInit( ). Session management functions are invoked after a successful bridge initialization. These functions are used to mange operation on the bridge for session setup and session cleanup. In particular these functions may include CreatSession( ) and DestroySession( ). Call management functions are invoked after a successful bridge initialization and a session has been created. These functions manage operation on the bridge for voice telephony call setup and call cleanup. In particular these functions may include CreatCall( ), DestroyCall( ), ConnectCall( ) and DisconnectCall( ). Announcement functions are invoked after a successful connection of a voice call to announce status. These functions are used to play pre-recorded or text-to-speech (TTS) announcements generated in a well known manner. In particular, these functions may include PlayAnnc( ), PlayTTS( ), BridgeAnnc( ) and UnbridgeAnnc( ). Conferencing functions may include AssociateHoldMute( ) and BridgeSession( ). DTMF Monitoring and Collection functions may include MonitorDigits( ), CollectDigits( ), PlayAnncAndCollect( ) and PlayTTSAndCollect( ), the latter for prompting for digit entry. Event notification functions can be received from core server CS 15 at any time. They are designed to tell the caller that something has happened that they should know. These include, for example, Eve_CallDisconnected and Eve_DigitsCollected( ) to tell the caller feedback on these events. Socket event notification functions are for notifying of events at sockets, for example, handle_cb( ), Req_AddInput( ) and Req_DropInput( ).

A typical SETUP message over an ISDN link within the Q.931 protocol may comprise the following: a protocol discriminator, a call reference value assigned by adjunct 120, a message type indicator (such as SETUP), bearer capabilities, a channel identifier, the calling party's number that may comprise a presentation indicator, a numbering plan identifier (for example, private or ISDN) and a screening indicator (such as user provided, verified and passed), a called party number with similar included number plan information and further including a number type such as national or international, a lock to codeset 6 and a billing number also including a presentation indicator, a numbering plan indicator, a number type and a screening indicator.

Referring to FIG. 3, typical messages that may be passed within the NAP 120 between the MAP 2000 124, 126 and the GS 140 and provide, for example, call progress information comprise constants, function parameters and have a predetermined structure. Typical constants include VBC messages, ERR messages, E messages and R messages. E messages relate to messages sent to the GS 140 and R messages are message received from the GTS. A typical VBC message is VBC_SUCCESS. A typical ERR message is ERR_LINE_BUSY. A typical E message is E_SESSION_CREATE and a typical R message is R_CALL_CONNECT. Typical function parameters include the call handle which comprises 4 bytes, digits collected, events, message identifier and the like. For example, the function parameter PHONE_NUMBER has a defined structure where the num_digits is 4 bytes and the number is a character pointer of 4 bytes.

Now, referring to FIG. 3, a two or three step process will be described for communicating between GS 140 (NAP 120) and a web server, such as an AT&T CallBroker (per FIG. 1c). FIG. 3 particular describes a set of function calls by exemplary name provided via the NAP Internet Interface to wideband link 30 preferably operating at, for example, 56 kilobits per second. The three step process comprises initiating what is referenced herein as a function call, a call, command or request, for example, for a response status from a core web server to a NAP regarding a function described within the function call. The function call may carry associated data indicated by the parenthetical ( ) which can vary among function calls. The NAP 120 responds to the function call by providing response status which includes data at least indicative of the status of the NAP relative to the function call. Since the response is immediate to the function call, there is no need in this embodiment to identify the function call in the response. Finally in a third step of a three step process, with the response status, the server issues a callback to the NAP that indicates further data, commands or the like relative to the function call and returned status.

In many, if not most, instances, each of the function calls specifically relates to internal messaging within the NAP 120 of FIG. 1c between the MAP 2000 124, 126 and the GS 140. For example, for a CreateSession( ) function call, there is a corresponding E or R message respectively between the MAP 2000 and the GS 140.

The AssociateHoldMute( ) function call relates to the web server 15's signaling the NAP to associate new weights to identified parameters. BridgeCleanup( ) relates to resetting and cleaning up a bridged call while BridgeInit initiates a bridge. BridgeSession( ) relates to a bridged Internet session. CreateSession( ) relates to creating a new bridge session. By way of example, the call broker 15 transmits this function call to the NAP GS 140 to create a new bridge session. Status responses to the call by the NAP 120 can be pending or a socket failure. A resulting callback from the web server 15 responsive to receiving the status response may be pending or insufficient resources.

DestroyCall( ) relates to tearing down any voice telephony links specified by associated data carried with the function call. Destroy session( ) relates to tearing down a particular session bridge. Disconnect call( ) is used to disconnect an active call. PlayAnnc( ) is used to initiate the play of a pre-recorded announcement/prompt on a voice telephony call given by a message identifier.

Future functions that may be implemented for further features such as tone playing, speech recognition, facsimile transmission and video conferencing include PlayTone( ), CollectSpeech( ) for alphanumeric or word strings, MonitorSpeech( ) for indefinite ASR collection, PlayAnncAndCollect( ) extensions to allow speech recognition or TDD digit collection, PlayAnncAndCollectSpeech( ) for alphanumeric or word strings, ConnectModem( ) for modem connection, Eve_ModemCollected( ), ConnectFAX( ), Eve_FAXCollected, and ConnectVideo. Other function calls may come to mind as further features of the present invention may be implemented over time.

There are three ways to implement a function call process similar to that described above. These comprise a synchronous request/response, an asynchronous request/response and an autonomous event response. In a synchronous request response, a function call is made for a given request and the return value of the call indicates the outcome almost instantaneously (or synchronously with the request). Messages may be sent to the NAP 120 to fulfill the request but no callback function needs to be executed. Examples of a synchronous request response may include BridgeInit( ), DestroyCall( ) and MonitorDigits( ).

In an asynchronous request/response, a function call is made for a given request and the return value indicates that the request has been submitted to the NAP and a response should be expected (but not immediately). A request message is sent to the NAP 120 where it completes successfully or fails and a response message is sent back to the web server generating a callback function. Examples of asynchronous request/response functions include ConnectCall( ), PlayAnnc( ), CollectDigits( ) and BridgeAnnc( ).

The third form of function call is an autonomous event response. An event on the NAP 120 triggers a message sent to the web server which generates a callback function that may not be associated to an earlier request one-for-one. Examples include Eve__CallDisconnected( ) when a call leg of links 6, 8 gets disconnected and Eve__DigitsCollected( ) to return digits entered while digit monitoring is on.

Requests can be made to more than one call or session in parallel, that is, the NAP 120 is a shared resource and can handle many calls or sessions simultaneously. Simultaneous or parallel requests to the same call or session may not be permitted based on the scenario.

Thus, a network-based method and apparatus have been described for initiating and completing a voice telephony call via the Internet which have all the advantages and features discussed including the ability to speak with a live application agent on a voice telephony call about the same web page simultaneously displayed on both the user's and the application agent's computer or other display via a pair of Internet links to the user and to the customer. Modifications and changes to the method and apparatus of the invention may come to the mind of one of ordinary skill in the art which should be deemed to comprise the present invention and which invention should only be considered to be limited by the scope of the claims which follow. All United States patents and patent applications referenced herein should be deemed to be incorporated as to their entire contents as to any subject matter believed essential to an understanding or implementation of the present invention.

What we claim is:

1. A method at a web server of communicating between a voice/data network gateway and the web server in a public telecommunications network to control the initiation and completion of a voice telephony call comprising the steps of:
   transmitting a message from the web server to the voice/data network gateway generated by a function call, the function call identifying a particular function and requesting a response;
   directing the voice/data network gateway to establish at least a first link and a second link, said first and second links being connected to complete said voice telephony call; and
   receiving a status response from the voice/data network gateway indicative of status relative to the request function wherein said method comprises a synchronous request response.

2. A method at a web server of communicating between a voice/data network gateway and the web server in a public telecommunications network to control the initiation and completion of a voice telephony call comprising the steps of:
   transmitting a message from the web server to the voice/data network gateway generated by a function call, the function call identifying a particular function and requesting a response;
   directing the voice/data network gateway to establish at least a first link and a second link, said first and second links being connected to complete said voice telephony call; and
   receiving a status response from the voice/data network gateway indicative of status relative to the request function wherein said method comprises a synchronous request response.

3. A method at a web server of communication between a voice/data network gateway and the web server in a public telecommunications network to control the initiation and completion of a voice telephony call comprising the steps of:
   transmitting a message from the web server to the voice/data network gateway generated by a function call, the function call identifying a particular function and requesting a response;
   directing the voice/data network gateway to establish at least a first link and a second link, said first and second links being connected to complete said voice telephony call; and
   receiving a status response from the voice/data gateway of status relative to the request function wherein said method comprises an autonomous event response.

4. A method at a web server of communicating between a voice/data network gateway and the web server in a public telecommunications network to control the initiation and completion of a voice telephony call comprising the steps of:
   transmitting a message from the web server to the voice/data network gateway generated by a function call, the function call identifying a particular function and requesting a response;
   directing the voice/data network gateway to establish at least a first link and a second link, said first and second links being connected to complete said voice telephony call; and
   receiving a status response from the voice/data network gateway indicative of status relative to the request function wherein said function comprises an initialization and termination function.

5. A method at a web server of communicating between a voice/data network gateway and the web server in a public telecommunications network to control the initiation and completion of a voice telephony call comprising the steps of:
   transmitting a message from the web server to the voice/data network gateway generated by a function call, the function call identifying a particular function and requesting a response;
   directing the voice/data network gateway to establish at least a first link and a second link, said first and second links being connected to complete said voice telephony call; and
   receiving a status response from the voice/data gateway indicative of status relative to the request function wherein said function comprises a session management function.

6. A method at a web server of communicating between a voice/data network gateway and the web server in a public telecommunications network to control the initiation and completion of a voice telephony call comprising the steps of:
   transmitting a message from the web server to the voice/data network gateway generated by a function call, the function call identifying a particular function and requesting a response;
   directing the voice/data network gateway to establish at least a first link and a second link, said first and second links being connected to complete said voice telephony call; and
   receiving a status response from the voice/data gateway indicative of status relative to the request function wherein said function comprises a call management function.

7. A method at a web server of communicating between a voice/data network gateway and the web server in a public telecommunications network to control the initiation and completion of a voice telephony call comprising the steps of:

transmitting a message from the web server to the voice/data network gateway generated by a function call, the function call identifying a particular function and requesting a response;

directing the voice/data network gateway to establish at least a first link and a second link, said first and second links being connected to complete said voice telephony call; and receiving a status response from the voice/data gateway indicative of status relative to the request function wherein said function comprises an announcement function.

8. A method at a web server of communicating between a voice/data network gateway and the web server in a public telecommunications network to control the initiation and completion of a voice telephony call comprising the steps of:

transmitting a message from the web server to the voice/data network gateway generated by a function call, the function call identifying a particular function and requesting a response;

directing the voice/data network gateway to establish at least a first link and a second link, said first and second links being connected to complete said voice telephony call; and receiving a status response from the voice/data gateway indicative of status relative to the request function wherein said function comprises a conferencing function.

9. A method at a web server of communicating between a voice/data network gateway and the web server in a public telecommunications network to control the initiation and completion of a voice telephony call comprising the steps of:

transmitting a message from the web server to the voice/data network gateway generated by a function call, the function call identifying a particular function and requesting a response;

directing by the voice/data network gateway to establish at least a first link and a second link, said first and second links being connected to complete said voice telephony call; and receiving a status response from the voice/data gateway indicative of status relative to the request function wherein said function comprises a signaling data monitoring and collection function.

10. A method at a web server of communicating between a voice/data network gateway and the web server in a public telecommunications network to control the initiation and completion of a voice telephony call comprising the steps of:

transmitting a message from the web server to the voice/data network gateway generated by a function call, the function call identifying a particular function and requesting a response;

directing by the voice/data network gateway to establish at least a first link and a second link, said first and second links being connected to complete said voice telephony call; and receiving a status response from the voice/data gateway indicative of status relative to the request function wherein said function comprises an event notification function.

11. A method at a web server of communicating between a voice/data network gateway and the web server in a public telecommunications network to control the initiation and completion of a voice telephony call comprising the steps of:

transmitting a message from the web server to the voice/data network gateway generated by a function call, the function call identifying a particular function and requesting a response;

directing the voice/data network gateway to establish at least a first link and a second link, said first and second links being connected to complete said voice telephony call; and receiving a status response from the voice/data gateway indicative of status relative to the request function wherein said function comprises a socket event notification function.

12. A method as recited in claim 6 wherein said call management function comprises adjusting transmission gain on a leg of a call link to one of a calling party or to a called party.

* * * * *